H. B. OWENS.
AUTOMOBILE LIGHT GLOBE HOLDER.
APPLICATION FILED APR. 30, 1919.

1,332,517. Patented Mar. 2, 1920.

WITNESSES
R. E. Rousseau
J. E. Brock

INVENTOR
H. B. Owens
BY
Munn & Co.
ATTORNEYS

UNITED STATES PATENT OFFICE.

HERBERT B. OWENS, OF ALTON, ILLINOIS, ASSIGNOR OF ONE-HALF TO SIMON HAUNSPERGER, OF ALTON, ILLINOIS.

AUTOMOBILE-LIGHT-GLOBE HOLDER.

1,332,517.		Specification of Letters Patent.		Patented Mar. 2, 1920.

Application filed April 30, 1919. Serial No. 293,796.

*To all whom it may concern:*

Be it known that I, HERBERT B. OWENS, a citizen of the United States, and a resident of Alton, in the county of Madison and State of Illinois, have invented certain new and useful Improvements in Autobomile-Light-Globe Holders, of which the following is a specification.

My invention relates to improvements in holders for light globes and more particularly to holders for electric light globes used on automobiles.

It frequently happens that while a driver is out on a road in a locality not provided with an automobile supplies house, that one or more electric lights, or globes, as they are more commonly termed, may burn out, and hence new ones cannot be readily obtained.

The main object of my invention is to provide means whereby a reasonable supply of extra or spare globes may be at hand at any time or place.

Another object of the invention is to provide such means as will permit the extra or spare globes to be carried on the automobile conveniently and safely against accident.

A further object is to produce a simple, cheap and efficient spare light globe holder that may be readily attached to the dashboard of any car without any changes in the car itself.

With these and other objects in view the present invention consists in certain particular features of construction, arrangement and combinations of parts as will be hereinafter fully described and pointed out in the claims, reference being had to the accompanying drawings in which—

Figure 1:
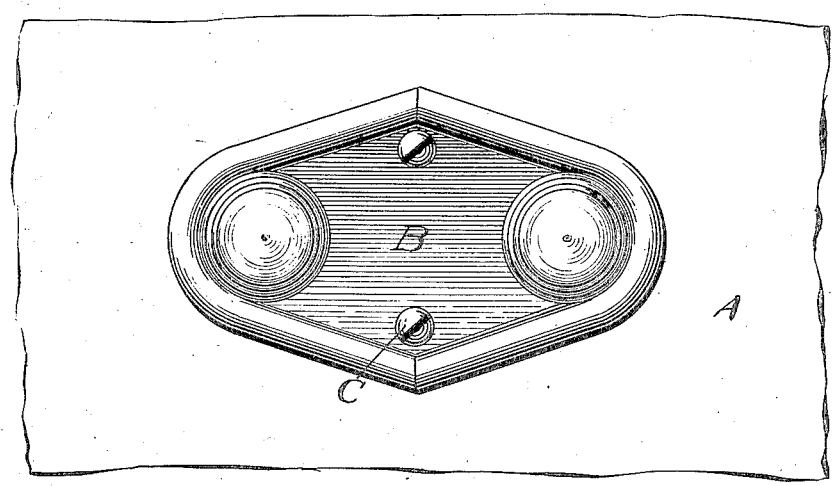
Figure 2:
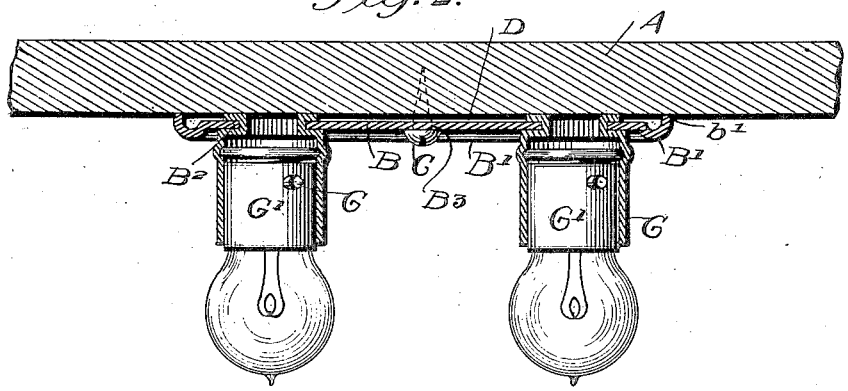
Figure 3:
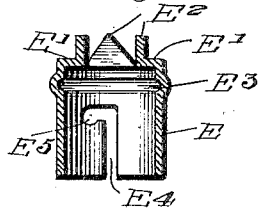
Figure 4:

Figure 1 is an elevation of my device as applied to the dashboard of an automobile, Fig. 2 is a central horizontal section thereof, Fig. 3 is a sectional view of the socket holding cup showing certain details thereof, Fig. 4 is a cushioning securing spring for holding the socket in the cup.

As showing a practical exemplification of the inventive idea involved in my invention I have selected the embodiment shown in the drawings, to which more specific reference will now be made.

In carrying out my invention which is to be applied to the dashboard A of an automobile at any point but preferably under the hood, I use a flat plate of metal B generally elongated and of the size and shape desired and raised by pressing, or stamping, a reinforcing and ornamental border bead B' completely around the edge or perimeter of the same. At suitable points and spaced from each other, square openings $B^2$ are made through the base plate, and at certain other suitable points round openings $B^3$ are made through the plate to receive screws or nails C by which the plate is to be secured to the dashboard A. In Fig. 2 is shown how this is done, and it should be noted that the flat edge $b^1$ of the border bead $B^1$ fits securely against the dashboard, holding the body portion of the plate offset from the dashboard, and providing a space D the office of which will later appear.

The lamp socket holder as will be seen in Fig. 3 comprises a cup member E having the bottom E thereof slit by diagonally crossing cuts and punched out to form the four prongs $E^2$ to be clenched into the square openings $B^2$ in the plate; the manner of disposing these prongs is shown in Fig. 2 and it is to be noted that the clenched ends of the prongs bear against the inner face of the plate and bear against the dashboard in the space D hereinbefore mentioned. This arrangement of the prongs with respect to the plate B provides a firm bearing for the socket holding cups.

Near the punched out bottoms of the cups the body is expanded to form an annular groove $E^3$, and in the groove is seated an end coil of a coiled spring which is shown in Fig. 4.

The cup member E is further provided with a bayonet slot $E^4$ having the retaining depression $E^5$ in the short arm thereof to receive a lug or projection G extending from the sides of an electric bulb socket G'.

The cup members will of course be made standard gage or size as is the practice in manufacture of electric light equipments.

To make the complete device ready for the market, the plate is first cut to the shape and size desired, the openings $B^2$ and $B^3$ punched out, and the reinforcing border bead formed around the edge. The cup member which has been made in the manner hereinbefore explained is then applied to appropriate openings in the plate and the prongs $E^2$ clenched; the coiled spring F is then forced into the cup with the large end coil innermost until said coil or convolution expands into and fills the groove E³, the smaller end of the coil spring extending toward the open end of the cup. The coiled spring member may of course be cylindrical or any other shape instead of tapering as shown, though this particular form of spring centers the frictional holding effect of the spring, and also maintains the cushioning effect at the center or axis of the bulb socket and permits the coils of the spring to be nested within each other. The plate and the cup with its contained spring having been assembled as set forth, the complete device can be readily applied to the dashboard of any automobile, and the lamp bulbs then inserted into the cups by way of the bayonet slot structure, and will be securely held therein ready for use yet cushioned against injurious jarring or jolting shocks.

I claim:

1. A device as herein characterized and consisting of a base plate having a reinforced border bead, spaced apart cup members detachably connected at one end to said base plate, bayonet slots in the sides of said cup members, an internal annular groove within said cup members adjacent their inner ends, and a spiral spring having one convolution seated in said internal annular groove.

2. A device as herein characterized and consisting of a base plate having circular openings therethrough and a flanged border, said plate adapted to be rigidly secured to a support and offset therefrom, and lamp-socket holding cups, adapted to be held within the aforesaid circular openings, said cups comprising a generally cylindrical wall and a flat bottom member, said bottom provided with crossing diagonal slits dividing the bottom into angular prongs adapted to be bent through the said circular openings in the plate and against the same in the offset space between the plate and its support, and means associated with the cup for resiliently and removably supporting a lamp bulb socket.

HERBERT B. OWENS.

Witnesses:
 H. A. HOFFMANN,
 J. O. LUCKEY.